(12) United States Patent
Ruefer et al.

(10) Patent No.: US 6,500,532 B1
(45) Date of Patent: Dec. 31, 2002

(54) EXPANDED PTFE MULTILAYER COMPOSITE SHEET

(76) Inventors: Bruce G. Ruefer, 623 Mountain View, Bozeman, MT (US) 59718; Rebecca U. Ruefer, 623 Mountain View, Bozeman, MT (US) 59718; N. Joseph Sharber, 258 E. Baxter La., Bozeman, MT (US) 59718; Leonard G. Marlow, 3250 Linney Rd., Bozeman, MT (US) 59718

( * ) Notice: Subject to any disclaimer, the term of this patent is extended or adjusted under 35 U.S.C. 154(b) by 0 days.

(21) Appl. No.: 09/374,483

(22) Filed: Aug. 13, 1999

(51) Int. Cl.[7] .............................. B32B 5/18; B32B 7/12; B32B 27/08; B32B 27/30
(52) U.S. Cl. ............................ 428/316.6; 428/317.5; 428/317.7; 428/422
(58) Field of Search .............................. 428/316.6, 421, 428/422, 317.5, 317.7

(56) References Cited

U.S. PATENT DOCUMENTS

| | | | | |
|---|---|---|---|---|
| 4,385,093 A | * | 5/1983 | Hubis | 428/316.6 |
| 5,641,566 A | * | 6/1997 | Kranzler et al. | 428/315.7 |

* cited by examiner

*Primary Examiner*—Paul Thibodeau
*Assistant Examiner*—Ramsey Zacharia
(74) *Attorney, Agent, or Firm*—Shook, Hardy & Bacon L.L.P.

(57) ABSTRACT

A low density highly porous laminate sheet material of expanded polytetrafluoroethylene/expanded thermoplastic. The composite sheet material comprises two or more layers of expanded polytetrafluoroethylene laminated with an expanded thermoplastic. A process to make the invention is disclosed.

2 Claims, 1 Drawing Sheet

EXPANDED PTFE MULTILAYER COMPOSITE SHEET

FIELD OF THE INVENTION

This invention relates to porous laminated expanded polytetrafluoroethylene.

BACKGROUND OF THE INVENTION

Porous expanded polytetrafluoroethylene (ePTFE) is a well-known fluoropolymer which is utilized in a wide variety of products. These products include such articles as waterproof rainwear, gaskets, electrical insulation, filters and human implants. Many of these articles and the processes for producing them are described in numerous United States patents.

ePTFE articles can be produced in any extrudable shape and as a single or multiple layered article depending on the desired physical properties. Because ePTFE is a thermoset polymer, bonding multiple layers together can be problematic. Various means have been used to laminate PTFE, including pressing the unexpanded extrudate together then expanding the multi-layered article, and by using various thermoplastic and thermoset polymer adhesives to bond expanded PTFE layers together. Most methods for laminating multiple layers with adhesives partially or completely block the pores of the ePTFE, rendering adhesive lamination unsuitable for articles where porosity is a desirable feature.

Means for laminating sheets of PTFE to produce a multi-layered microporous article are described in Gore (U.S. Pat. Nos. 3,953,566 and 4,187,390), Hubis (U.S. Pat. Nos. 4,385,093 and 4,478,665) and Kranzler (U.S. Pat. No. 5,641,566). Gore and Hubis teach that layers of PTFE extrudate may be laminated together without using an adhesive. The lamination is achieved by layering PTFE extrudate then bringing the layers into intimate contact by means of pressure. The extrudate is then expanded and sintered to form a porous multi layered article. Although high Z directional strengths as measured in the laboratory can be attained by making laminated ePTFE articles according to these teachings, these laminates are known to delaminate in use.

A thermoplastic fluoropolymer, fluorinated ethylene propylene (FEP) is known in the art as a suitable agent for laminating layers of PTFE. For example, facial implants comprising ePFTE sheets laminated with sheets of FEP can be found in the medical marketplace. Implants laminated in this fashion are not known to delaminate in use, however, articles produced by this method are known to be non-porous and hence unsuitable for applications where porosity is a desirable.

SUMMARY OF THE INVENTION

The present invention is a porous composite comprising two or more layers of ePTFE sheet laminated with a with an expanded thermoplastic. The components of PTFE tape and FEP film are layered together, brought into close contact, then expanded simultaneously in one simple step. The inventive article is low density, soft, and very porous.

DETAILED DESCRIPTION OF THE INVENTION

The inventive article is a porous multi-layered composite sheet material comprising two or more layers of ePTFE laminated with an expanded thermoplastic film. It is often desirable to sinter the inventive article above the crystalline melt point of PTFE, and many thermoplastic adhesives degrade at sintering temperatures. Thus, in a preferred embodiment the thermoplastic film is a fluoropolymer such as FEP, or an alternative thermoplastic that can withstand temperatures up to about 400 degrees C.

A preferred embodiment is a FEP laminated sheet material. This article is produced by alternately layering sheets of PTFE extrudate with thin films of FEP. The PTFE extrudate/FEP layers are brought into close contact by calendering. This composite is then expanded above the melting point of the FEP and below the crystalline melt point of the PTFE. The expanded product may be sintered above the crystalline melt point of the PTFE. The resulting ePTFE/expanded FEP (eFEP) composite article is, non reactive, low in density and soft or compliant making it an excellent biomaterial.

Alternatively, substituting calendering with a step wherein the PTFE/FEP layers were subjected to pressure by any other means, such as a press or die would produce a similar article. The important feature of this process is that the layers of the PTFE/FEP layered material are brought into close contact.

DETAILED DESCRIPTION OF THE FIGURES

Figure 1:
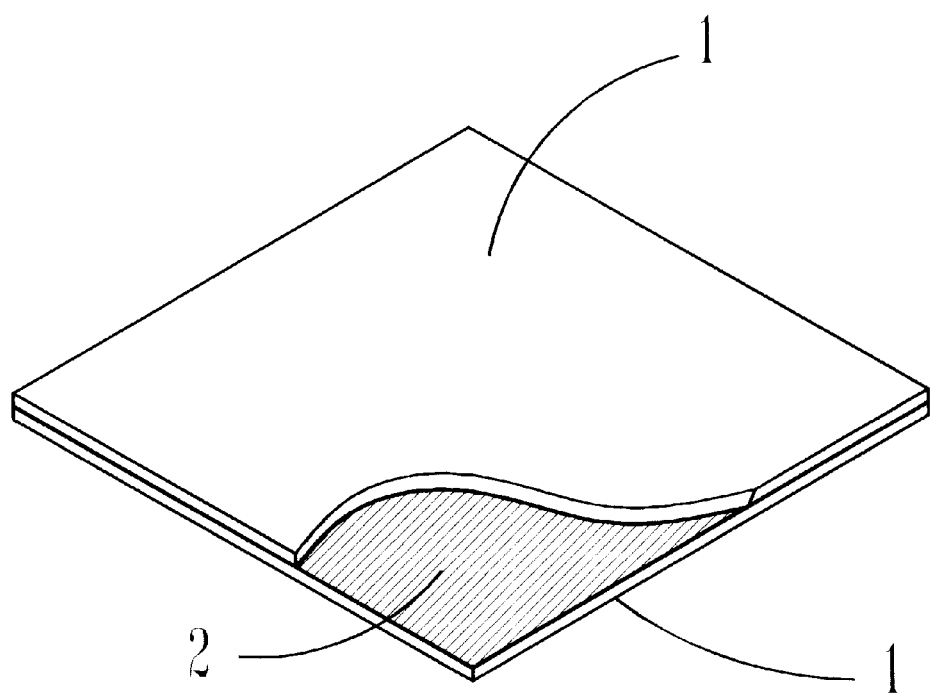
FIG. 1 is a drawing of a preferred embodiment of the invention showing the alternately layering sheets of ePTFE sheet with a thin film of eFEP.

A three dimensional drawing of a preferred embodiment of the invention is shown in FIG. 1. The layer of eFEP 1 is shown between the layers of ePTFE sheets 2. Due to the expanded nature of both the ePTFE and eFEP, the layered assembly is porous.

EXAMPLE 1

PTFE extrudate tape 0.020 inches thick was made and cut into 6×6 inch squares. 10 PTFE extrudate sheets were layered alternately with a sheet of FEP 0.0005 inches thick between each PTFE extrudate sheet. The layered FEP/PTFE extrudate sheets were calendered to a final thickness of about 0.10 inches. The layered composite was multi-axially expanded at a temperature above the melt point of the FEP and below the crystalline melt point of the PTFE. This ePTFE/eFEP composite sheet was then sintered above the crystalline melt point of PTFE. The material was tested according to standard ASTM methods and the results are shown in TABLE 1.

TABLE 1

| MATERIAL | TENSILE STRENGTH | MATRIX TENSILE | DENSITY |
| --- | --- | --- | --- |
| Preferred Invention | ~13 Kg/cm | ~95 Kg/cm | ~0.3 gm/cc |

The nature of the present invention can be seen in the test data. The density of the present invention is very low at 0.3 gm/cc showing that the material is about 85% porous. The low density of the preferred invention is contributed to by a high porosity This high porosity, in turn, is physically characterized by a very soft or compliant mechanical property.

We claim:

1. A polytetrafluoroethylene (PTFE) composite comprising:

expanded first and second layers of PTFE;

an expanded third layer sandwiched between an inner surface of the first layer and an inner surface of the second layer as the result of compressive forces having been applied to both an outer surface of the first layer and an outer surface face of the second layer;

wherein the third layer is a thermoplastic sheet of fluorinated ethylene propylene.

2. A polytetrafluoroethylene (PTFE) composite comprising:

expanded first and second layers of PTFE;

a substantially continuous expanded sheet of fluorinated ethylene propylene sandwiched between an inner surface of the first layer and an inner surface of the second layer as the result of compressive forces having been applied to both an outer surface of the first layer and an outer surface face of the second layer;

the composite having a porosity of about 60 to 85 percent.

* * * * *